March 24, 1964 S. ATKIN 3,126,249
LEACHED ZONE PHOSPHATES MINERAL RECOVERY
Filed March 12, 1959
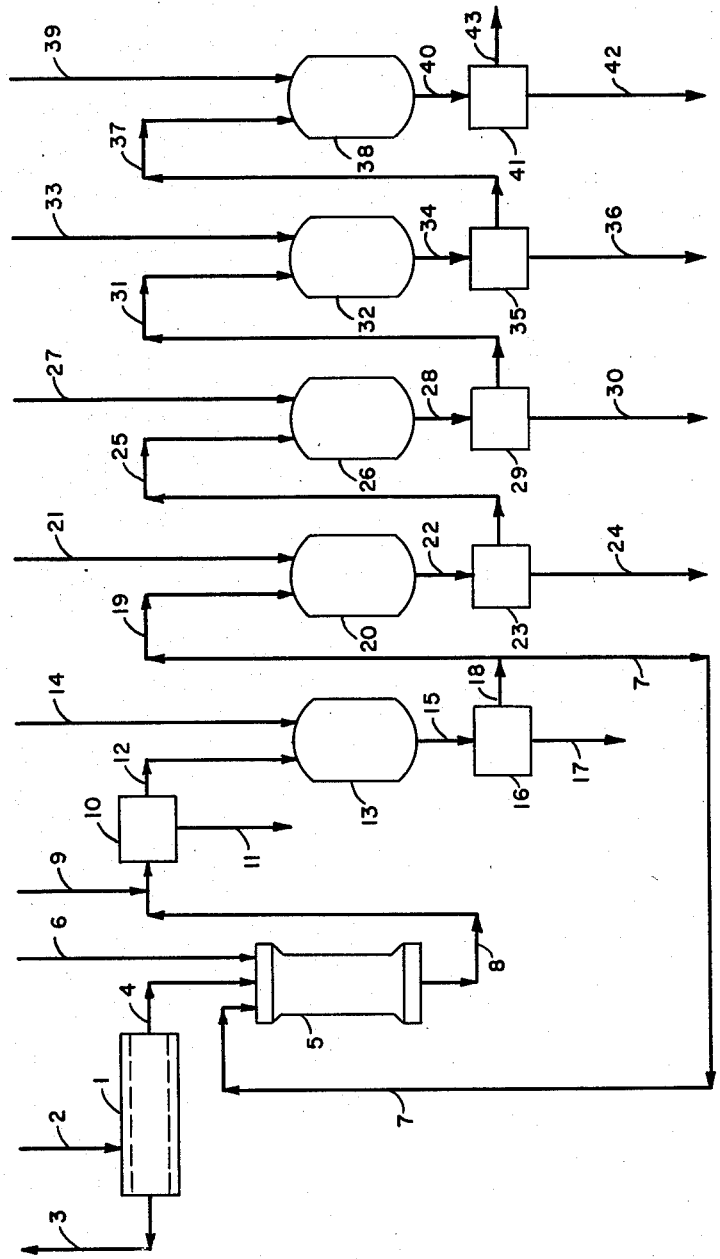
SYDNEY ATKIN
INVENTOR.
BY J. W. McCloskey
AGENT

United States Patent Office 3,126,249
Patented Mar. 24, 1964

3,126,249
LEACHED ZONE PHOSPHATES MINERAL RECOVERY
Sydney Atkin, Springfield, N.J., assignor to Chemical Construction Corporation, New York, N.Y., a corporation of Delaware
Filed Mar. 12, 1959, Ser. No. 799,011
5 Claims. (Cl. 23—14.5)

The present invention relates to a recovery of mineral values from leached-zone phosphate material which overlays Florida pebble phosphate rock deposits. An improved process is disclosed, which provides more efficient and greater mineral recovery.

Leached zone material consists of a mineral deposit which has been formed as the product of the geological leaching of pebble phosphate. In the operations in which pebble phosphate is commercially recovered in Florida and elsewhere, the leached zone material is removed as waste overburden, prior to the open-pit mining of pebble phosphate rock. Thus millions of tons of this material are discarded annually. Basically the leached zone material is a soft aluminum phosphate. In practical mining operations some calcium phosphate will also be included in the total discard. The material is not suited for usage in fertilizer manufacture, because of the high aluminum content. Should such material be acidified in the conventional fertilizer operation, the result is a sticky gummy mass with poor spreadability and other physical drawbacks. Although the leached zone material is a potential source of aluminum, uranium and phosphate, commercial processing of this material has not been feasible up to the present time. Numerous proposals have been advanced as to processes for treating this material, especially processes in which the material is digested with sulfuric acid in an aqueous slurry and the mineral values subsequently removed in a liquid solution by filtration. Other modifications include preliminary high temperature calcining of the leached zone material, and acid digestion in an autoclave at elevated pressure.

After the initial recovery of mineral values in a liquid solution, the subsequent processing of the solution for minerals separation and final recovery may utilize a variety of methods. Some of this processing has been discussed in U.S. Patent Serial No. 2,769,686.

The present invention is primarily concerned with the processing of the leached zone material which results in the production of the intermediate liquid solution rich in mineral values. One of the principal problems encountered concerns the filtering of the acidic aqueous slurry, so as to separate the liquid solution rich in mineral values from the solid waste material. This separation has heretofore been a difficult operation in practice, due to the fact that the solid waste material possesses highly undesirable filtration characteristics. Thus in practice it has been found that slow filtration rates are encountered, with considerable loss of mineral constituents in the filter cake.

An object of this invention is to provide an improved process for the recovery of mineral values from the leached zone material from the Florida pebble phosphate overburden.

Another object is to provide a process for the recovery of mineral values from leached zone material which achieves more efficient and faster processing in the separation of a liquid solution rich in mineral values from solid waste material.

A further object is to increase the recovery of aluminum values from the liquid solution rich in mineral values produced by the acid digestion of leached zone material.

These and other objects will become apparent from the description which follows.

It has been found that a remarkable improvement in filtration rate and a considerable improvement in the recovery of mineral values is achieved by the addition of a flocculating agent to the acidic aqueous slurry, prior to filtration to remove solid waste material. Furthermore, this improvement is achieved only when the leached zone material is initially calcined prior to the acid digestion. Evidently the preliminary calcining alters the physical composition of the material in such a manner as to allow the flocculating agent to become effective. In any case, the overall result is an improved filtration rate and a dryer filter cake. This latter improvement reduces the loss of minerals in the discarded filter cake and results in a higher process efficiency.

An additional improvement in this invention involves the processing of the mineral-rich solution after removal of solid waste material. This solution is usually treated by first adding ammonium sulfate plus sulfuric acid to supply sulfate ions, and thereby crystallizing the double salt ammonium aluminum sulfate, known as alum. Other soluble sulfate-supplying compounds could be used in place of sulfuric acid but sulfuric acid has been found to be cheaper and gives better results since no contaminating anions are added to the solution. The alum crystals are filtered off and separately processed to produce a final product aluminum salt or aluminum oxide. It has been found that recycling a portion of the solution after the alum crystallization, and preferably utilizing this liquor as a component in the acid digestion of calcined material, is a highly advantageous process modification. This procedure increases the phosphate and uranium concentrations in the mineral-rich solution produced when the acidic aqueous slurry is filtered. Since the solubility of alum decreases in stronger phosphoric acid, a higher yield of alum results from this modification in the alum crystallization step.

A preferred embodiment of the invention will now be described, as outlined in the figure. Referring to the figure, leached zone material is first fed to a suitable calcining operation 1 via 2. The incoming material analyzes as follows:

| | Percent |
|---|---|
| $P_2O_5$ | 16.22 |
| Al | 16.16 |
| U | 0.022 |
| CaO | 4.00 |
| F | 0.54 |
| Fe | 0.80 |
| $SiO_2$ | 29.20 |

The calcining takes place at an elevated temperature somewhere between 700 deg. C. and 1000 deg. C., preferably 900 deg. C. In addition to overall physical and chemical changes, this heat treatment drives off a portion of the fluorine present via 3. The calcined material, with fluorine content reduced to 0.20%, leaves via 4 and enters high pressure autoclave 5. Here the material is mixed with makeup sulfuric acid admitted via 6 and recycle solution entering via 7. A premixing tank could be used advantageously to blend the dry and liquid materials prior to their being delivered to the autoclave. The resulting slurry is digested and the calcined material is leached in autoclave 5 for a sufficient time interval to effect a dissolving of mineral values into the aqueous solution. In this case the leaching required 45 minutes and took place at 165 deg. C. and 200 p.s.i.g. The components are balanced so that a pH between 0.2 and 0.8 is maintained in the autoclave. This operating range produced a maximum extraction of the desired minerals with minimum sulfuric acid consumption. In addition, a major portion of the undesirable iron is rejected as insoluble sulfates which is another valuable feature of this invention.

The resulting acidic aqueous slurry leaves the autoclave via 8, and the flocculating agent is added via 9 and mixed into the slurry. In this example, a 1% solution of Separan 2610 was employed as the flocculating agent. About 4 ml. of solution was added per pound of total slurry, equivalent to about 100–150 p.p.m.

This invention in its broader aspects is not dependent on the particular flocculating agent used to treat the slurry, as a variety of flocculating agents may be effectively used for this purpose. However, the polyelectrolyte resins described in detail in U.S. Patent Serial No. 2,625,529 as being suitable for improving the tilth of surface soils are preferable treating agents for the purposes of this invention. These polyelectrolyte resins have a weight average molecular weight of at least 10,000 and have a structure derived by polymerization of at least one monoolefinic group through the aliphatic unsaturated group, said structure being substantially free of cross-linking.

Among the many flocculating agents described in this patent those most effective as applied to this invention are the polyelectrolyte linear carbon chain resins of relatively high molecular weight ranging from about 50,000–100,000 as a minimum to about 2,000,000–3,000,000 or more. Specifically, best results are obtained using the partially hydrolyzed polyacrylamides having molecular weights above 50,000 and preferably between about 500,000 and 3,000,000 containing about 2–30% of carboxyl groups or carboxylic acid sodium or ammonium salt groups and about 70–98% of amide groups, the partially hydrolyzed polyacrylonitriles having molecular weights within the range of about 50,000 to 500,000 and the partially hydrolyzed copolymers of acrylamide or acrylonitrile with vinyl esters such as vinyl acetate or with vinyl esters having molecular weights above about 50,000.

The slurry, after addition of the flocculating agent via 9, is passed to filtering unit 10, which is a conventional solid-liquid filter. A polyethylene filter cloth was employed in unit 10, and a rapid filtration rate of 40 lbs. per sq. ft. per hour was obtained. The filter cake did not crack and contained only 45% moisture. The solid cake is discarded via 11 and the mineral-rich solution recovered via 12. Overall recoveries of mineral values in the liquid solution at this point were 94.5% Al, 95.0% $P_2O_5$ and 96.0% U. In addition, a relatively low 17.0% of the incoming iron was present in the solution, the balance having been removed to discard in the cake via 11. Thus the process effectively improved the recovery of mineral values with increased efficiency of operation. The analysis of the solution was:

| | |
|---|---|
| Spec. gravity @ 25 deg. C | 1.380 |
| pH | 0.50 |
| $P_2O_5$ percent | 8.00 |
| Al do | 7.00 |
| $U_3O_8$ g./l | 0.12 |
| Fe percent | 0.14 |
| Free $H_2SO_4$ do | 3.40 |
| Total $SO_4$ do | 23.70 |
| F do | 0.10 |

The solution is passed via 12 to vessel 13, in which the precipitation of aluminum values as alum is accomplished at 25 deg. C. by addition of ammonium sulfate via 14. Also, sulfuric acid may be added via 14 for required sulfate ions. The resulting slurry containing alum crystals is passed via 15 to separator 16 in which the alum is separated from the residual solution. Unit 16 is a crystal filter or separator of standard design. The product alum crystals are removed via 17, while the residual solution is passed to further processing via 18. Stream 18 contains the following:

| | |
|---|---|
| $P_2O_5$ percent | 9.00 |
| Al do | 1.00 |
| $NH_4$ do | 0.80 |
| $SO_4$ do | 0.80 |
| $U_3O_8$ g./l | 0.13 |

The residual solution 18 is divided into two portions. Part of the stream passes to further processing via 19, while a portion is recycled via 7 to the digesting autoclave 5. This solution recycle, containing in normal operation about 7%–10% $P_2O_5$, performs an important function. The solubility of alum decreases in stronger phosphoric acid. The recycle builds up the phosphate concentration in the solution 12 resulting from the processing in units 5 and 10 and consequently a more complete alum precipitation is achieved in vessel 13. The recycle modification results in a definite improvement over prior practice in which makeup water is added in the digestion step, either as a separate stream during or subsequent to the acid treatment, or in the form of more dilute digestion acid.

The remaining process solution stream 19 now passes to mixing vessel 20, and sufficient soluble calcium salt such as calcium chloride is added via 21 to produce a precipitation of the remaining sulfate in solution as $CaSO_4$. The solution with precipitated sulfate is passed via 22 to filter 23 in which calcium sulfate is separated and discarded via 24.

The residual solution 25 is now preferably processed for $P_2O_5$ recovery as dicalcium phosphate in a manner similar to the process described in U.S. Patent No. 2,799,557. Separate recovery of uranium values is also readily accomplished. This aspect of the process will be briefly described.

The solution 25 is passed to mixing vessel 26, and sufficient calcium hydroxide is added via 27 to raise the solution pH to about 2.8–3.0 and precipitate a portion of the $P_2O_5$ as impure fertilizer grade dicalcium phosphate. Various contaminating impurities are removed from the solution with the precipitate. The process stream is passed via 28 to filter 29 and the solid fertilizer grade dicalcium phosphate removed as a product via 30.

The residual solution passes via 31 to vessel 32, and sufficient sodium hydrosulfite is added via 33 to provide substantially complete recovery of uranium values as uranous phosphate precipitate. The stream passes via 34 to filter 35, and a product uranium cake containing 40–50% $U_3O_8$ is removed via 36.

The residual solution now passes via 37 to mixing vessel 38, and sufficient calcium hydroxide is added to the solution via 39 to raise the pH to about 5.0–6.0 and effectively precipitate the remaining $P_2O_5$ value as a relatively pure feed grade dicalcium phosphate. The stream passes via 40 to filter 41 and the solid feed grade dicalcium phosphate is removed via 42. The final residual solution is discarded via 43.

Various modifications besides those previously mentioned may be made in the processing of this invention, especially in terms of operating ranges. Thus effective heat treating such as calcining is preferably carried out at a temperature between about 700 deg. C. and 1000 deg. C. However, depending on the grade or natural characteristics of the leached zone material, effective calcining might be done at a temperature below 700 deg. C. or perhaps in some cases a temperature above 1000 deg. C. might be required. In any case, it appears that some preliminary heat treatment such as calcining is required prior to the subsequent usage of the flocculating agent, in order for the flocculating agent to produce the desired improvement in filtering rate and other process benefits such as increased recovery of mineral values.

It should be noted that this invention is not limited to the recovery of mineral values in a process in which autoclave leaching is employed. This invention is also applicable to the other methods of solubilizing mineral values from leached zone material such as those described in U.S. Patent No. 2,769,686.

Additionally, other known procedures may be employed for the treatment of the mineral-rich solution to recover these mineral values in usable form. For example, this invention is not limited to the procedure of U.S.

Patent No. 2,799,557. This procedure was selected, however, as being preferable for application to the dilute $P_2O_5$ solutions produced in this invention.

Various other modifications within the scope of this invention, besides those mentioned above, will be apparent to those skilled in the art.

I claim:

1. A process for recovering mineral values from leached zone material derived from phosphate rock overburden and containing significant amounts of aluminum mineral values which comprises heat treating said material at a temperature above about 700 deg. C. and below about 1000 deg. C., reacting the heat treated material with sulfuric acid and an aqueous recycle solution, adding to the resulting acidic aqueous slurry flocculating amounts of a polyelectrolyte linear carbon chain resin selected from the group consisting of partially hydrolyzed polyacrylamides having molecular weights above 50,000 and containing 70% to 98% of amide groups, partially hydrolyzed polyacrylonitriles having molecular weights within the range of about 50,000 to 500,000, partially hydrolyzed copolymers of acrylamide with vinyl esters having molecular weights above about 50,000, and partially hydrolyzed copolymers of acrylonitrile with vinyl esters having molecular weights above about 50,000, filtering solid material from the aqueous slurry, adding ammonium sulfate and sulfuric acid to the filtrate solution and thereby crystallizing a double salt of ammonium and aluminum sulfate, filtering said crystals from the solution, recycling a portion of the residual solution as the aforementioned aqueous recycle solution, dissolving a soluble calcium salt into the balance of the residual solution and thereby precipitating calcium sulfate, filtering said calcium sulfate from the solution, adding calcium hydroxide to the solution and thereby precipitating phosphorus values as dicalcium phosphate, and filtering said dicalcium phosphate from the solution.

2. Process of claim 1, in which sufficient sulfuric acid is added to produce an acidic aqueous slurry having a pH between about 0.2 and about 0.8.

3. Process of claim 1, in which the heat treated material is reacted with the sulfuric acid and aqueous recycle solution at elevated pressure.

4. Process of claim 1, in which the calcium hydroxide is added in a two stage process comprising adding sufficient calcium hydroxide to raise the solution pH to a value between 2.8 and 3.0 thereby precipitating an impure fertilizer grade dicalcium phosphate containing mineral constituents, filtering said fertilizer grade dicalcium phosphate from the solution, adding further calcium hydroxide thereby raising the pH to a value between 5.0 and 6.0 and precipitating a relatively pure feed grade dicalcium phosphate, and filtering said feed grade dicalcium phosphate from the solution.

5. Process of claim 4, in which uranium values are precipitated from the solution by the addition of sodium hydrosulfite and separately recovered by filtration, subsequent to recovery of fertilizer grade dicalcium phosphate and prior to addition of further calcium hydroxide.

References Cited in the file of this patent

UNITED STATES PATENTS

| | | |
|---|---|---|
| 2,685,369 | Crossley | Aug. 3, 1954 |
| 2,740,522 | Almine et al. | Apr. 3, 1956 |
| 2,767,045 | McCullough | Oct. 16, 1956 |
| 2,849,280 | Le Baron | Aug. 26, 1958 |
| 2,885,259 | McCullough | May 5, 1959 |
| 2,937,143 | Goren | May 17, 1960 |

OTHER REFERENCES

Dow Chemical—Separan 2610, New Dow Flocculant, volume 18, No. 1, 1955.

Mining Engineering, "Polyacrylamides for the Mining Industry," McCarty et al., volume 11, No. 1, January 1959, pages 61–65.